United States Patent
Allen, III et al.

(10) Patent No.: US 6,335,376 B1
(45) Date of Patent: Jan. 1, 2002

(54) APPARATUS AND METHOD FOR ENHANCING PARTITIONING OF DIFFERENT POLYMERIC MATERIALS FROM A MIXTURE BY DENSITY DIFFERENTIAL ALTERATION

(75) Inventors: Laurence E. Allen, III; Darren F. Arola, both of Richmond, CA (US)

(73) Assignee: MBA Polymers, Inc., Richmond, CA (US)

(*) Notice: Subject to any disclaimer, the term of this patent is extended or adjusted under 35 U.S.C. 154(b) by 0 days.

(21) Appl. No.: 09/320,190

(22) Filed: May 26, 1999

Related U.S. Application Data (60) Provisional application No. 60/086,684, filed on May 26, 1998.

(51) Int. Cl.$^7$ ................................................. C08J 11/04
(52) U.S. Cl. ........................................ 521/40.5; 521/40
(58) Field of Search ............................ 521/40, 405, 45, 521/45.5, 62; 209/11, 164, 168, 169, 170

(56) References Cited

U.S. PATENT DOCUMENTS

| | | | |
|---|---|---|---|
| 3,599,788 A | | 8/1971 | Fyfe et al. |
| 4,342,830 A | | 8/1982 | Holloway |
| 4,504,436 A | * | 3/1985 | Louvier ...................... 264/321 |
| 4,617,111 A | | 10/1986 | Grimm et al. |
| 4,656,074 A | * | 4/1987 | Conley et al. ................. 428/95 |
| 4,809,854 A | * | 3/1989 | Tomaszek ...................... 209/3 |
| 4,844,351 A | | 7/1989 | Holloway |
| 5,061,735 A | | 10/1991 | Zielinski |
| 5,126,058 A | * | 6/1992 | Beckman .................... 210/774 |
| 5,158,986 A | * | 10/1992 | Cha et al. ..................... 521/82 |
| 5,246,116 A | | 9/1993 | Kirk |
| 5,301,810 A | | 4/1994 | Spencer |
| 5,303,826 A | | 4/1994 | Buzga |
| 5,377,844 A | * | 1/1995 | Hwang ........................ 209/167 |
| 5,399,433 A | * | 3/1995 | Kobler ........................ 428/407 |
| 5,462,973 A | * | 10/1995 | Serad et al. ................... 521/62 |
| 5,589,520 A | * | 12/1996 | Merz et al. .................... 521/64 |
| 5,590,789 A | | 1/1997 | Stricker et al. |
| 5,653,867 A | | 8/1997 | Jody et al. |

FOREIGN PATENT DOCUMENTS

| | | |
|---|---|---|
| DE | 42 00 584 A1 | 7/1993 |
| DE | 4304726 A | 8/1994 |
| EP | 0469904 A | 2/1992 |
| EP | 0557895 A | 9/1993 |
| EP | 99924522 | 6/2001 |
| JP | 54-10585 | 5/1979 |
| RU | 1567290 A1 | 5/1990 |

OTHER PUBLICATIONS

Jacob Leidner "Plastic Waste Recovery of Economic Value" *Ontario Research Foundation*, pp. 91–101 (1981).
Dr. Johannes Brandrup "Recycling and Recovery of Plastics" *Hanser Publishers*, 3.2: pp. 635–643, 254–259, 275–280.
Kishan C. Khemani "Polymeric Foams" *Science and Technology–ACS Symposium Series*, 101–103, 195–199.
"Tps—thermo plastic sorting" *Inner*.
*Garbage, Trash, Refuse, Waste, Discards, Rubbish & Junk, The Book 2*, Nicholas and Dezenhall Communication Management Group, 1992, p. 40.
Biddle, Michael B. and Mann, Ray, "Recipe for Recycling", *IEE Spectrum*, Aug., 1994, pp. 22–24.
Biddle, Michael B. and Fisher, Michael M., "A Mechanical Recycling Process for Recovery of Plastics from End of Life Computer and Business Equipment", Conference Proceedings of 22$^{nd}$ Annual Technical Conference, Structural Plastics Division of SPI, Apr. 10–13, 1994.
Biddle, Michael B. "An Overview of the Recycling of Plastics from Durable Goods", Conference Proceedings of International Plastics Recycling Conference, Society of Plastics Engineers, Chicago, IL, Nov. 3–4, 1994.
Biddle, Michael B. "Advances in Mechanical Separation and Recycling of Mixed Automotive Plastics", Conference Proceedings of auto Recycle 94, Dearborn, MI, Nov. 8–9, 1994.
"Plastics in . . . the USA", Society of Plastics Industry, Washington, D.C.
*Waste Age's Recycling Times*, Jan. 24, 1995.
*Modern Plastics*, Mar., 1994, pp. 61–62.
*Plastics News*, Feb. 6, 1995.
*Facts & Figures of the U.S. Plastics Industry*, The Society of Plastics Industry, Inc., 1993, p. 23.
Plastic and the Environment, *The Society of Plastics Industry, Inc, 1991*, p. 47.

* cited by examiner

Primary Examiner—Edward J. Cain
Assistant Examiner—Katarzyna Wyrozebski-Lee
(74) *Attorney, Agent, or Firm*—Fish & Richardson, P.C.

(57) ABSTRACT

A differential density alteration (DDA) device to enable the separation and partitioning of particles of one or more selected members of plastics included in a mixture of a plurality of different plastics in which each member of the plurality of different plastics is divided into discrete particles. The DDA device heats the mixture to a temperature for a time that causes the particles of the one or more selected members to alter in such a way that the difference between the apparent density of the particles of the selected one or more members and the apparent density of particles of the other members of the mixture (the differential density), after heating, is different from the differential density before heating, whereby the alteration in differential density produces a differential density alteration (DDA). A plastics density separator, having a suitable partition curve, will separate and partition the selected particles of the selected one or more altered plastics members from the altered mixture with improved efficiency and precision. The DDA invention enhances and enables superior separation and partition of different types of plastics and/or different grades of the same plastics from such mixtures.

19 Claims, 4 Drawing Sheets

FIG. 1

A PARTITION CURVE FOR A SEPARATOR

FIG. 2

FIG. 4
SCHEMATIC OF AN ADVANCED MRF INCORPORATING EMBODIMENT OF THE PRESENT INVENTION

FIG. 6

MASS DISTRIBUTION FOR TWO ABS GRADES BEFORE AND AFTER HEATING

APPARATUS AND METHOD FOR ENHANCING PARTITIONING OF DIFFERENT POLYMERIC MATERIALS FROM A MIXTURE BY DENSITY DIFFERENTIAL ALTERATION

CROSS REFERENCES TO RELATED APPLICATIONS

This application claims priority from provisional patent application: Density Alteration of Polymeric Materials to Allow Differentiation and Separation, Laurence Allen and Darren Arola, May 26, 1998; jc541 U.S. PTO 60/086,684 the entire contents of which is incorporated herein by reference.

FIELD OF THE INVENTION

The invention relates to the separation and purification of plastics.

BACKGROUND

The production of plastics accounts for over $40 billion of annual product sales and more than 3% of the United States consumption of oil and natural gas. More than 90% of our production of these valuable materials is discarded. This is a considerable waste of natural resources and imposes an unwanted growing burden on people, cities, regions, agencies concerned with management and conservation of resources and pollution, and of course, ultimately on the environment. Improved collection, separation and reuse of plastics would tend to alleviate worsening of these burdens. If the collection, separation and reuse of plastics were sufficiently improved, plastics recycling could become one of the largest raw materials industries worldwide within a decade.

By generating over 80 billion pounds of material or $270 billion of production per year, and being responsible for approximately 3.2 million jobs, plastics and related businesses represent an extremely important materials industry to the United States. Unlike other material industries like steel and aluminum, however, this industry depends almost solely on new sources of raw material, most of it imported petroleum. This dependence becomes even more significant as the growth rate of plastics continues to outpace that of all other materials. Wasting this important material resource has significant international trade, economic and environmental implications.

The US produces almost 20 billion pounds per year of valuable engineering plastics for use in durable goods. These products are increasingly being collected and recycled at the end of their useful lives to avoid disposal costs and potential liabilities, and to recover metals and other marketable raw materials. The engineering plastics contained in these products are often one of the most valuable materials on a cost per pound basis, yet most of this valuable plastic resource is therefore landfilled, incinerated, or sent to Asia for recycling and reuse there.

Examples of the plastics recycling problem are evident in the case of so called 'disposable' plastic bottles and in durable goods. The main barrier to the recycling of a majority of bottles is that separation is limited to density-based systems which require significant pre-sorting by plastic type at Material Recovery Facilities (MRFs), leading to insufficient feedstock supply and poor economics. The main barrier to recycling of plastics from durable goods, such as automobiles, appliances, and computer and electronic equipment, is the multitude of plastic types and with different grades of the same type of plastic, often with overlapping densities, which must be separated. The re-use of such plastics, even if they can be separated, is often complicated by their degree of contamination, e.g. paint, metal film coatings and the like.

SUMMARY

Embodiments may include one or more of the following advantages. The inventions enable the plastics to be separated from complex mixtures and recycled with high purities that result in higher market values. The recycling concept is certainly not new to plastics. Plastics have been recycled and reused since the beginning of their commercial use. Scrap and uncontaminated rejected parts generated from a manufacturing process are shredded and reused, typically back into the same application. As with other types of materials such as metal and glass, different types of plastics must generally be separated from one another to achieve high purity and consistent extruding or molding performance i.e., consistent physical properties typically verified by standardized ASTM tests (Izod impact, Deflection Test Under load (DTUL). Melt Flow Index (MFI) and the like) and higher market values.

Plastic types include acrylonitrile-butadiene-styrene (ABS), flame retardant (FR) ABS, ignition resistant (IR) ABS, acrylonitrile-styrene-acrylonitrile (ASA), high density polyethylene (HDPE), high impact polystyrene (HIPS), FR HIPS (a flame retardant HIPS), IR HIPS (an ignition resistant HIPS), low density polyethylene (LDPE), polyamide (PA), polybutylene terephthalate (PBT), polycarbonate (PC), PC/PBT (a blend of PC and PBT), PC/ABS (a blend of PC and ABS), FR PC/ABS (a FR blend of PC and ABS), polyethylene (PE), polyethylene terephthalate (PET), polymethyl methacrylate (PMMA), polyoxymethylene (POM), polypropylene (PP), polyphenylene oxide (PPO), polystyrene (PS), polyvinyl chloride (PVC), PVC/ABS (a blend of PVC and ABS), styrene acrylonitrile (SAN), styrene-butadiene rubber (SBR), styrene maleic anhydride (SMA), thermoplastic polyolefin (TPO), thermoplastic polyurethane (TPU), thermoplastic elastomer (TPE). Most plastics of different types are not compatible with one another, and while some commingled applications have been demonstrated, they capture much lower values than virgin plastic because the significant physical properties and characteristics are much less controlled, if at all, i.e. the plastics are of lower grade. With lower grade or lower purity products, the processing and performance flexibility afforded by purified single resin streams or compounded resin combinations (co-polymers) of consistent characteristics is lost.

As important, perhaps, is the ability to separate different grades of the same type (i.e., polymers built from the same monomer or monomers, but of different molecular weight, different ratios of monomers, different molecular morphology, different additive composition, concentration and the like) of plastic. Different plastic grades (i.e. plastics of the same type with a different range of properties) can have significant differences in important physical properties: e.g., medium impact, low gloss ABS and high-heat ABS.

Although an increasing number of bottles and rigid containers of all types are being recycled, a significant improvement in collection and reprocessing economics is needed for a majority of bottles to be recycled. Other types of plastics packaging (film, coatings, and closures) are recycled at a considerably lower rate than bottles. Durable goods (e.g.

buildings, automobiles, appliances, and computer and electronic equipment) are gaining attention as a recycling opportunity as these types of products are increasingly being collected at the end of their useful lives by recyclers and manufacturers who recover useable components and metals. Although more plastic is actually used in durable goods than in packaging, technical barriers preclude their economical separation from these mixed material streams using conventional methods.

The problem of separating different polymeric materials from each other is the primary obstacle to economically recycling polymeric materials from durable goods, particularly when they have similar or overlapping density distributions. Durable goods are generally formed from a number of different types and grades of polymeric articles arranged as separate component sub-structures (pieces or parts) combined or attached into a unitary item, e.g., a computer monitor with a case of one material having several other sub-assemblies attached by glue, molding, or fasteners and the like.

Most plastic parts coming from durable goods streams contain unique challenges that are not met by the automated conventional plastics cleaning and sorting processes developed for packaging materials. The principle practice today for the recovery of highly contaminated scrap is hand-separation, which is cost prohibitive in most cases. The challenges in recycling plastics from durable goods include:

The plastics used in durable goods are more specialized than those used in packaging. Whereas the majority of plastic packaging can be categorized in five grades of plastic resin, more than fifty plastic resin grades might be required to comprise a similar fraction of the durables market. For example, while the PET plastic used to make a soda bottle may also be appropriate for a water bottle, the acrylonitrile-butadiene-styrene copolymer (ABS) used to make a computer housing is very different from the sort used in a refrigerator door, which is different again from that used in an automobile. This broad variety of materials increases the difficulty of separation.

In addition to different plastic types, many parts contain a wide variety of reinforcements, fillers, and pigments. Changing filler content and foaming agents causes material density to vary even within the same type of plastic.

Durable plastic parts often contain high levels of metal contamination, including wiring brackets, structural pieces, and molded-in screw inserts.

Paint and metallic coatings (i.e., contamination) on some parts make identification, sorting, and melt reprocessing much more difficult.

Larger and more variable thickness (i.e., parts having widely differing morphology) wall sections, increases the challenges associated with size reduction and particle size and shape control.

The apparent density of a plastic can be different from the intrinsic density of the plastic especially when the plastic is "foamed". A foamed plastic includes small bubbles or voids. The apparent density is often lower than the intrinsic density because it includes a contribution from encapsulated voids or vapor bubbles within material.

This invention relates to modifying the density or apparent density of polymers, particularly polymers in a mixture of different polymers or polymer grades, to effect purification and separation.

The invention relates to the separation and purification of plastics. Specifically it is related to apparatus and methods of separating a selected one or more members (selected plastic) of a mixture consisting of divided plastics and partitioning the selected member(s) into respective containers or output product streams separated from the balance of the mixture and from each of the other selected members.

The invention also relates to apparatus and methods for providing separated and partitioned output product streams (or separated containers) of individual types or grades of divided plastic by separating and partitioning plastics received from input recycling product streams of different types and grades of bulk plastic articles obtained from industrial and consumer product waste streams.

The invention specifically relates to mixtures that include a set of discrete members of divided polymeric materials of different types and/or grades. The divided polymeric materials may be prepared by dividing substantially larger formed and shaped articles made essentially from a single type or grade of plastic to enable separation or purification of one or more of the selected members from the mixture, especially a mixture of polymeric materials which is initially inseparable. The materials are typically divided (e.g., shredded, granulated, or ground) into discrete particles, flakes, shreds, i.e., free flowing. It would be advantageous to provide plastics recycling plants capable of handling mixed post-consumer plastic. When commercialized, similar plants could have a throughput comparable to large virgin plastic production facilities. Plastics could be recovered for reuse in similar or other applications. Plants could be built to accept shredded or baled mixed-rigid plastic containers or durable plastic goods. This could eventually make sorting of plastic waste at curbside unnecessary and lead to increased utilization of other waste materials such as paper, metals and glass by complementing the economics of their reuse.

Accordingly, several objects and advantages of the present invention are:

to provide a means of altering or shifting the apparent density of a polymeric material without degradation of the material;

to provide a means of altering the difference in apparent density between two discrete polymeric materials in such a way as to enable the separation of the two discrete polymeric materials;

additionally to provide a means of retaining the altered difference in apparent density between two discrete polymeric materials in the absence of the action or agent inducing the alteration;

to provide differentiation of polymeric material(s) within a mixed stream;

to provide a way of separating different component(s) of a mixed plastic stream based upon apparent density or specific gravity;

to provide a way of recovering purified plastic types from mixed streams containing different plastic materials;

to provide a way of improving the purity of a polymeric material by removing plastics;

to provide a plastic density differential alteration system and process i.e. differential plastic "foaming", for separating HIPS and ABS from appliances and unfoamed PC, PC/ABS, IR-HIPS, FR-HIPS, FR-ABS, and IR-ABS from computer and business equipment by shifting the density of one of the plastics by at least 0.03 g/cc;

to provide a separation process and system incorporating the differential density alteration process in combination with a de-foaming system and process for separating foamed PC, PC/ABS, PPO, IR-HIPS, and IR-ABS by selectively narrowing the density distribution for a given plastic by a considerable fraction;

to provide an alternative differential attribute alteration process to separate plastics based on differential morphology (e.g. thickness) alteration of different grade or type plastic chips having an initially uniform aspect;

to provide an integrated Material Recovery Facility combining one or more of the embodiments of the present invention into a overall recycling process for each or any of the following post-consumer sources: bottles and rigid containers, appliances, computer and electronic equipment (ESR), and automobiles (ASR);

to enable design, construction and operation of Material Recovery Facilities that provide throughputs of several multiples of conventional bottle recycling plants that have acceptable product quality;

to provide a means to alleviate broadening and overlap of the density distributions of different polymers in a mixture caused by size reduction;

to provide a plastic attribute (e.g. density) differential alteration responsive to a physical action (e.g. heat) in which the resulting material becomes separable;

For particular mixes of different grades and/types of mixed polymer waste streams (the input feedstock). Sets of procedures and criteria are established for a broad range of separation technologies, one or more of which can be selected to work for each particular separation which must be effected. The most effective combination of technologies can be incorporated into a final large scale advanced Material Recovery Facility (MRF) for commercial use.

The actual configuration of particular unit operations incorporating embodiments of the present invention within a given advanced Material Recovery Facility can be based on selected criteria of anticipated ease of use and economics. The innovations associated with these end configurations are discussed below.

DESCRIPTION OF THE PREFERRED EMBODIMENT(S)

The problem in particular is the vast variation in the product stream presented to the sorter. The sorter has to try to create order and uniformity out of a chaotic mix of materials of different sizes, shapes, and density even if the preceding processing equipment has reduced the scope of the job to require only the separation of plastics.

Figure 1:
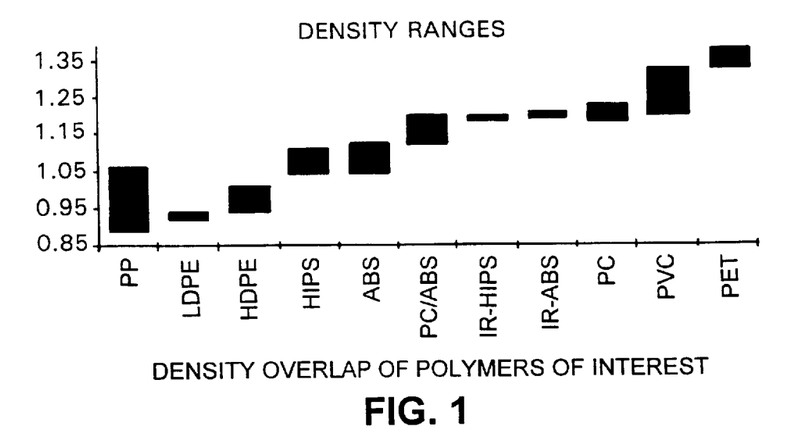
FIG. 1: Density overlap of polymers of interest

FIG. 1 illustrates some of the key separation challenges presented by close or overlapping material densities in today's durable product streams. Some specific examples include: 1) The separation of ABS and PP from automotive interiors. Although in pure forms ABS is heavier than water and PP is lighter, the addition of fillers into PP has heretofore made simple density separations impossible; 2) The separation of ABS and high impact polystyrene (HIPS), which are both used in refrigerator liners; 3) The separation of flame retardant grades of ABS and HIPS (FR-ABS and FR-HIPS) used in computer housings and other large computer components (these differ from the refrigerator grades of ABS and HIPS in that the ignition resistant additives increase the material density); 4) The small, yet high value stream consisting of polycarbonate (PC) and blends (of different grades) of PC/ABS which are used in higher end computer housings. In fact, most multi-material assemblies contain some polymer density overlap separation challenges.

Many plastics are somewhat permeable to moisture and/or other gases and solvent-like substances, they tend to absorb water or vapors. These absorbed vapors may cause microfoaming that can effect their apparent density (specific gravity) depending on the heat cycle history and their history of exposure to solvents and other vaporous materials that can be absorbed. This creates additional variability in the characteristics of plastics coming into the recycling processes stream.

Separator Characteristics

Most mechanical separators, such as hydrocyclones, take advantage of physical property differences between materials to segregate them. A common physical property that these techniques exploit is a difference in material density. Separators are generally of the binary type, i.e., receiving an input stream and providing two different output streams for partitioning the input into the two outputs based on a difference between two (or more) components in the input stream. Binary separators can be mathematically characterized by a partition curve, FIG. 2. The partition curve shows the fraction of one material, say material A, provided at one separator output as a function of a separation parameter, in this case specific gravity or density of the material to be separated. The cut density point, (CDP) is defined as the value of the separation parameter at which the fraction of material A provided at the one separator output is 50%, obviously, this is also the value at which 50% of A is provided at the other output. As an example, a hydrocyclone using water of specific gravity (s.g.) equal to one g/cc processing a plastic with a s.g.=1 g/cc, half the plastic would exit the top or vortex of the cyclone and half would exit the bottom or apex of the cyclone. The slope of the partition curve indicates its ability to separate other materials closely related by the separation parameter.

Figure 2:
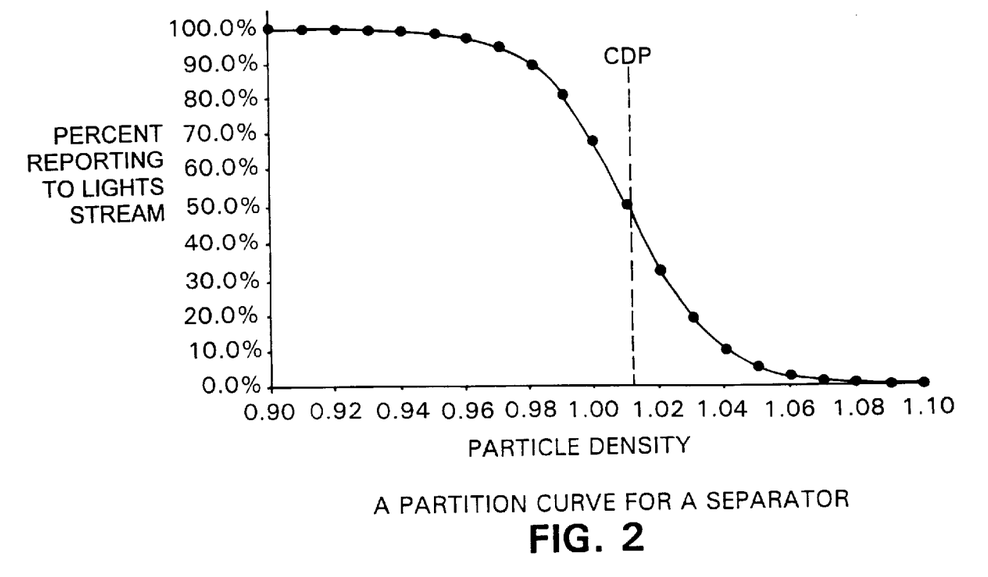
FIG. 2: A partition curve for a separator

It is an advantage to have a separator characterized by a steeply sloped partition curve which enhances efficiency, especially for closely related materials. For a given separator slope, it is advantageous to increase the difference between the densities of the incoming material stream to be sorted, i.e., provide differentiation to the input stream by altering the density difference between them.

The primary separation technique used today in plastics recycling plants is sink/float, conventionally performing in large baths of salt solution or a slurry of a finely divided insoluble mineral material. The salt (such as calcium nitrate) or mineral is added to increase the density of a (water) solution (slurry) to the chosen point and the plastic is added. Heavy plastics sink, light plastics float and so separation is achieved. The use of hydrocyclones that take advantage of higher settling forces is spreading. The greatest advantage of hydrocyclones is increased throughput at lower capital cost.

Even when a durable good assembly is found to contain little or no density overlap problems from the polymers in the mixture, size reduction can create them. It has been shown that significant broadening of plastic particle density distributions occur after size reduction. When many polymers are granulated, small voids are generated at their edges due to polymer micro-crazing and simply rough edges. Furthermore, as the particles become smaller, inhomogeneities in voids, fillers or level of crystallinity that were averaged in larger particles become more consequential as they become concentrated in some particles and absent from others. The density distribution again spreads, usually centered near the nominal density of the polymer. However, the spread of the distribution from the size reduction provides yet another obstacle in the goal of using density to partition different polymers in a recycling process stream.

Input material must be granulated, shredded, flaked, separated by size before density differentiation. A density sorter isn't able to sort or sort effectively unless the input materials are differentiable by the sorter.

A more sophisticated density separation or another mechanical separation technique which could be used in conjunction with the existing technology is required to broaden the scope of materials which can be feasibly recovered from a mixed rigid plastics stream. To do this, a second physical property difference by which to effect a separation is required. A number of physical properties besides density have been investigated to effect plastics separation, including: electrostatic properties, spectroscopic properties, x-ray fluorescence, surface adhesion properties, terminal velocity characteristics, and material fracture properties.

Since many plastics are somewhat permeable to moisture and/or other gases and solvent-like substances, they tend to absorb water or vapors. These absorbed vapors may cause micro-foaming that can effect their apparent density (specific gravity) depending on the heat cycle history and their history of exposure to solvents and other vaporous materials that can be absorbed. This creates additional variability in the characteristics of plastics coming into the recycling processes stream.

Accentuating or increasing difference in material density (density differential/differentiation) between two polymers.

The invention described herein allows density differentiation between different polymeric materials distributed as a random aggregation of discrete articles (flakes or pieces) in a mixed polymeric material stream in which one or more or the different polymeric materials originally have comparable densities (identical or overlapping distributions). This method can significantly enhance or enable the separation and purity improvement of polymeric materials that are initially minimally separable or inseparable. A Material Recovery Facilities plant incorporating embodiments of the present invention may be built to accept shredded or baled mixed rigid plastic containers or durable plastic goods having a wide variety of polymeric material (plastics) and provide improved separation fractions of the separated product or products. This invention provides a means for sorting (partitioning) of plastic waste at curbside unnecessary and lead to increased utilization of other waste materials such as paper, metals and glass by complementing the economics of their ruse.

Embodiments of the present invention are effectively applied in combination with conventional separation processes and with other advanced processes such as a plant that will operate the partitioning process under pressure. Material Recovery Facilities that will operate the present density differential alteration invention could take advantage of this means by which the thermal properties of plastics can be exploited to dramatically enhance separation efficiency, throughput, cost reduction, purity and improved recycled product consistency. The inventions disclosed in this application will enable and enhance what previously were difficult or impossible separations on large scale, economically important mixed feed streams.

The present invention enables or enhances density differentiation (the alteration of density differential) between polymeric materials of a mixed polymeric material stream that originally have comparable densities. This method promises to significantly improve the separation and purity of polymeric material that are initially inseparable with density separation technology.

Differential Density Alteration (DDA) of Polymers by Application of Heat.

A reliable and simple difference between types of plastics is their differential response to temperature and temperature changes. Improving processing economics in mechanical recycling of plastics can benefit from systems of increased temperature control as well.

The possibility to segregate plastic materials on the basis of differential thermal properties, increases the scope of plastics which can be recycled by a straightforward mechanical system. The present process involves two steps: 1) differential alteration of physical properties (bulk or surface) or geometry (morphology) of feedstock plastics shapes as a result of the cost-effective application of heat and 2) separation (partitioning) of the resulting differentially altered feedstock plastics into separable product streams or bins of different target plastics based on the differentially altered physical properties or morphology.

The way a plastic responds to differential density alteration by heating (also referred to as the foaming response) is a result of its chemistry (monomer structure and polymer structure), fillers (mica, glass, carbon, other plastics, flame retardants, other inorganics, and the like), its heat and stress cycle history, its surface condition, its shape (morphological structure), manufacturing additives (added for molding and extruding control e.g. mold release and anti-static agents) and contaminants (both bulk and surface). The response is manifested by changes in apparent density and a general thickening of the flake. The intrinsic density of the particle is not necessarily altered but small vapor bubbles are present within the particle which expand its apparent volume and thus decrease its apparent density. The thickening of the flake can also be used to separate plastics from a mixture in cases where two mixture components do not maintain the same average thickness differential after treatment.

When using differential density alteration, or foaming response, to effect separations, two of the most useful properties (characteristics) are its "softening point" and density, both intrinsic and apparent density. The softening point of a plastic is a practical way of describing the temperature at which it will deform (modifying its morphology) and yield under applied (or built-in) stress. The chemistry of the polymer determines its glass transition temperature, softening point, crystalline melting point, and degradation temperature. Often plastics which are chemically quite similar will have different softening points. Fillers are added to achieve specific property requirements; for example, glass fibers, talc and calcium carbonate raise the softening point and/or modulus of a plastic so that it may be used under more extreme conditions. Variations in filler content also change material strength, density and fracture properties. Contaminants within a plastic are unintentional additives which can make it more brittle or cause bubbling upon heating.

Differential Density Alteration by Foaming

Many plastics absorb water (or other vapors) and must be dried before extrusion to avoid undesirable effects such as splaying, foaming, or degradation. If the plastics are heated, the absorbed substance may form vapor (stream) bubbles inside the material if two conditions exist: 1) the plastic is above its softening point so that it can deform and form bubbles and 2) the pressure is lower than the saturation pressure for water at that temperature. The water that is expanding inside the plastic during foaming is equivalent to several tenths of a percent of the polymer mass. When water turns to steam its volume tends to increase greatly (one gram of water occupies about one cubic centimeter which tends to expand to 1.24 liters at standard temperature and pressure, an expansion factor of 1,240) which can lead to foaming. This can shift the "apparent" density of a plastic significantly. Apparent is used here as a modifier since the intrinsic plastic specific density has not changed on a microscopic scale just the observable behavior of a plastic piece (e.g., a flake or particle) containing microscopic (or visible) vapor bubbles.

Foaming limitations

If the plastic is heated too slowly, the water can slowly diffuse out through the surface of the flake before forming vapor bubbles, the fully desorbed (dried) plastic will not foam with further heating. Most plastic heating systems are designed to work in a slow fashion which encourages vapor to escape because the formation of bubbles is undesirable. Thus conventional plastic dryers are generally inappropriate for the task of plastic foaming. The formation of steam (vapor) bubbles in a plastic may be additionally controlled by adjusting the temperature and pressure. One plastic may be separated from another by a combination of three techniques.

The first technique is used when one target plastic material absorbs water and the other does not. The materials must only be heated above the softening point of the water-absorbent polymer and then cooled. The foaming will occur naturally when the pressure is brought below the saturation pressure of water. In simple cases, such as with refrigerator liners, ABS may be made to float in water while the HIPS will be unaffected and continue to sink.

The second technique could be employed when more than one material absorbs water. It would require that the softening point of only one of the materials be exceeded.

A third technique could be used to separate a three or more polymer mixture in which two or more foam to different degrees at the same temperature. For example, a computer product stream containing the three overlapping density plastics (FR-HIPS, PC, and PC/ABS) could be differentiated in a single step to one stream of different plastics, the densities of which do not overlap by virtue of the fact that they foam to different degrees. Many more applications can be enabled with sufficient material characterization.

In using water as a source of the vapor when foaming material, the plastic must be heated rapidly under essentially no pressure to allow the bubbles to foam. This makes it difficult to accomplish the foaming in a hot water slurry because applying pressure to avoid boiling the water in the slurry inhibits the boiling of the water inside the plastic. To use the differential density alteration foaming technique in a water slurry the process takes advantage of the fact that plastics cool more slowly than the surrounding water. Additionally, different plastics will cool differently depending on the heat transfer coefficients and morphology.

For example, plastic chips take in excess of one minute to heat or cool down completely with a 130° C. temperature differential. If they were heated to 150° C. and then the water were cooled to 100° C., some plastics will be soft enough to foam for about 30 seconds. A heated, pressurized slurry is then passed through a heat exchanger to cool the water and the pressure released to initiate foaming. Alternatively, the fluid stream is flashed through a throttling valve or the solids transported to a lower pressure environment by an auger. Another alternative is to cause the foaming as a pre- or post-treatment of material in an air convection oven or fluidized bed, or preferably on a moving conveyor belt passing beneath a heat source or infrared heating panels.

Foaming of several different types of plastic may be observed in an oil bath. The observed "weight" of the plastic sample (i.e., the force exerted on a balance beam supporting the sample suspended in the oil) was recorded as the oil was heated. The mass of the supported sample in air, the air temperature, the mass of the sample in oil and the oil temperature are sufficient to determine the "apparent" polymer density.

The data showed the extent to which some mixtures of different materials may be differentially altered by heat, e.g., by expanding in oil, baking in a convection oven, radiated heat, microwave and the like. The ABS swelled at 150° C., the PC/ABS at 160° C., and the PC at 180° C. The polymers begin foaming at quite distinct temperatures, (e.g. PC/ABS would not foam at all at 150 C.). The HIPS polymer is usually unaffected by the treatment.

Further control of the volatile content in polymer mixtures to be foamed is provided by pre-processing the input feed stock under controlled conditions of selected gases under controlled pressure and temperature. The choice of foaming agent or agents to be introduced to promote foaming of the selected plastic or plastics in a mixture at a subsequent heating step and the temperature, time and pressure may all be used as parameters for the pre-processing the plastic mixture prior to differential density alteration of varied feestock mixtures.

Preferred foaming agents include liquid water and steam and carbon dioxide or solvents such as short-chain hydrocarbons.

Differential density alteration by Foaming with Carbon Dioxide

One difficulty of using water as a foaming material is that the pressure used to avoid boiling of the water in the slurry also reduces the possibility of boiling the water inside the plastic. This difficulty would be avoided if the foaming media were not water. Carbon dioxide is a suitable choice. Because water is very polar, it dissolves in plastics with polar groups or "hydrophilic" regions. This is why ABS which contains acrylonitrile absorbs much more water than does HIPS which contains no such hydrophilic group. Carbon dioxide has no net dipole moment, which may lead to it being soluble in many more polymers than is water.

To achieve concentrations of $CO_2$ in the plastics high enough to initiate foaming, its concentration must be raised significantly above levels found in air. Also, it is believed possible to saturate many plastics with $CO_2$ in carbonated water under pressure or in a pressure vessel without water, and then lower the pressure to "boil" the $CO_2$ within the plastic without boiling the water. This takes advantage of the fact that $CO_2$ is much more volatile than water. For example, it is believed that a water slurry at 120° C. and under 60 psig of $CO_2$ can serve to saturate polymers with a sufficient quantity of $CO_2$ to allow foaming. The water would be depressurized to 30 psig to allow the $CO_2$ to "boil" inside certain softened polymers to form bubbles without the tremendous heat loss associated with boiling the water in the slurry. Once the plastic is foamed, the mixture can be separated inexpensively and completely using standard density-based techniques. Because this pressurizing step itself requires very little energy to accomplish, it can be repeated at several different fluid temperatures by of transferring the solids to a slurry of water at different temperatures. The flexibility of the carbon dioxide DDA technique would arise from the fact that the relative softening point and the relative solubility of $CO_2$ in the plastics can be used to separate a mixture of the two plastics.

Density Alteration by De-Foaming

Structural foam is a term used to describe a technique of plastic part formation which incorporates voids (bubbles) in the interior of the part to reduce its weight and the mass of plastic used. Structural foamed materials appear in high volumes in the computer and electronic equipment market. These materials cannot be effectively separated using current density separation technology because the variable degrees of foaming cause the density to vary over a wide range even within the same part. Foamed plastic may be compressed at a temperature above its softening point and then cooled under this pressure to eliminate or reduce the gas bubbles. This will greatly narrow the density distribution and improve product quality.

Figure 3:
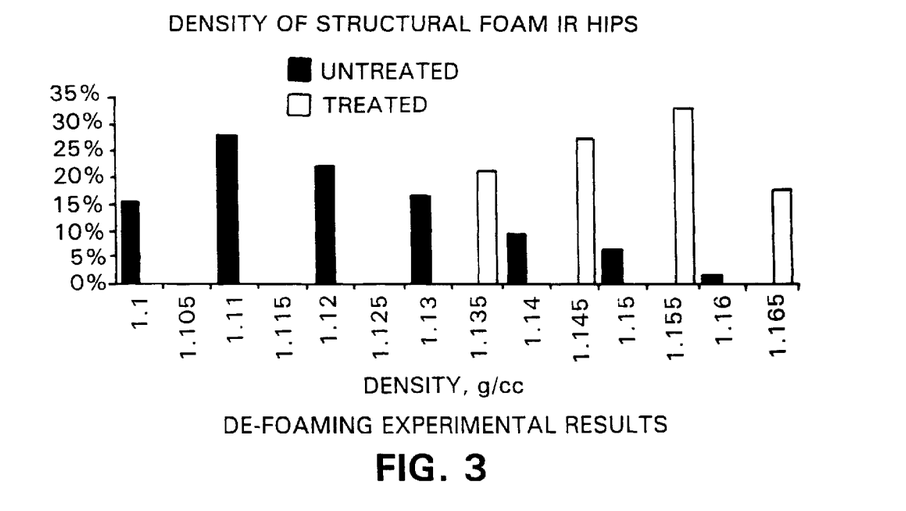
FIG. 3: De-foaming experimental results.

Bench-top experiments were performed to illustrate this phenomenon. Granulated structural foam IR-HIPS from a computer housing was heated to 150° C. in a 2-liter reactor and cooled under an applied pressure of 13.4 bar (180 psig). The density distribution of the material compared to the untreated starting material is given in FIG. 3. FIG. 3 demonstrates the significant differential density alteration and narrowing of the density distribution that can be achieved. It should be noted that un-foamed IR-HIPS has a density of about 1.17 g/cc.

Another potentially important use of de-foaming is in conjunction with a foaming separation. Because it is easier in a pressurized wet process to de-foam than it is to foam, separations may be more simply made by foaming all the polymers in an oven or separate process loop first and then selectively de-foaming them.

Exposure to a hot water environment in unit operations of large scale Material Recovery Facilities could hydrolyze some plastics. These plastics would be of little value if their molecular weights fall below a certain level. Fortunately, the relative hydrolytic stability of many of the plastics in wide use is high and can be controlled by limiting exposure times. Even if hydrolytic damage destroys some materials, there are likely to be enough others to find many successful feed streams.

The differential density alteration process is applicable to recycling mixed polymers both for purification of a single polymer (grade shifting to higher grade materials) and for mixed polymer property improvement (concentrating or narrowing parameter distributions or spread).

The testing used for characterizing acceptable separated product output include tensile, toughness, colorability, flow, extrusion and molding properties. Standardized tests such as ASTM MFI, DUTL and IZOD impact are used to characterize separated product after passing through an MRF incorporating the present invention.

Pretreatment process options.

Frequently, one or more pretreatment steps will be beneficial before DDA. Pretreatment of the material prior to thermal treatment is beneficial in enabling improved separations or the enhanced recovery of target materials. Pretreatment can have a profound impact upon the purity of target material(s), yield(s), and process efficiency. The most important pretreatment steps are pre-density sorting, size and thickness sorting, and volatile component equilibration. The first pretreatment step narrows the density distribution prior to thermal treatment. This ensures that one or more materials will not shift in density as to overlap with other materials, while the other two pretreatment steps are aimed at ensuring foaming uniformity and control.

If a polymer mixture is processed that contains a number of polymers of varying density ranges, it may be advantageous to remove those materials that have a density both below and above that of the target material(s) to be thermally treated. These two pretreatment steps are aimed to inhibit the contamination of other polymers within the foamed target stream by eliminating those materials that either; 1) have a density less than the target material(s) but do not shift in density upon being subjected to the thermal treatment step causing instances where the foamed polymer(s) attain the same density as the lower density material that did not shift in density, or 2) have a density greater than the target material(s) prior to the thermal treatment step but exhibiting a more substantial shift in density upon being subjected to the thermal treatment step than the target material(s) which may then cause an overlap in density with the foamed target polymer material(s). In both of these cases the need to conduct these two tasks will be based upon the number and type of polymers within the polymer mixture, foaming properties of each polymers within the mixture, and acceptable contamination levels for a given target material.

Heat transfer from one side of the particles to the other is a function of thickness. Sorting the polymers by size and thickness prior to the thermal treatment step can act to narrow thermal history characteristics between like and unlike polymeric materials. The amount of energy required to increase the temperature of a given plastic particle mass is proportional to the mass of the material, whereas the heat transfer rate to the material is controlled by the exposed heat transfer area. Thus, the ratio of the materials' surface area-to-volume will impact the temperature distribution within the material as a function of time, causing instances where a particle with a surface area-to-volume ratio higher than another particle, of the same or different type, may greatly exceed the temperature of the other within the residence time of the thermal treatment step. Hence, sorting the material prior to the thermal treatment step can narrow these differences between particles, enabling more uniform heat histories. Improved yields could result from this practice, and also improved purity if other materials within the mixtures shift in density at a temperature very near to that of the target material(s). The degree of sorting needed for a mixture is more likely unique to the materials of the mixture, and its specific response to the thermal treatment method.

The environment of the material can have a profound impact upon the level of volatile components within the material. The mass transfer rate to or from said material is a function of the surrounding conditions and the material itself. Hot and dry environments may allow the volatile component diffusion from said material, whereas immersion in liquid, humid, or pressurized, or vapor-filled environments may act to increase the level of volatile components within the material. Similar to the heat transfer model explained above, the relative surface for mass transfer can also impact the volatile component composition and quantity. And, if said materials are mixed from different environments, components from one source may not shift in density upon the thermal treatment step whereas another like particle but containing more volatile components would foam, or there may be a large distribution of the relative shifts in density based upon the different levels and types of volatile components within said target material(s). Subjecting the mixture to a pretreatment step where said mixture is allowed to equilibrate in the amount of one or more volatile components, where other materials may or may not be susceptible to this mass transfer, can act to improve the consistency of density shift in said target material(s) upon subjecting them to the thermal treatment step. In turn, this pretreatment step may be altered to remove one or more volatile from said materials to inhibit density shifts (dry the material).

System alternatives for Differential Alteration of Plastic Density Differential Foaming Using Water or CO2

Five options for differentially foaming plastics are:

IR heating plastic on a moving belt;

foaming of entrapped water in heated air or on heated surface;

foaming of entrapped water in a water slurry;

foaming of entrapped CO2 by heating on a moving belt;

foaming of entrapped CO2 in heated water or air;

accomplishing any of the former operations in a pressurized environment.

Some associated unit operation in an integrated Material Recovery Facility that can be combined with the differential density alteration system and process are the units to feed and extract plastic materials from a water system operated under pressure and at a temperature of 100 to 180° C. To avoid unacceptably high heat loss, the entering and exiting solids must be as dry as possible. Mechanical dryers suitable for the purpose may be obtained from suppliers knowledgeable in the art or modified to meet required time, temperature profiles in moderate or large scale operation.

Any transportation of water into or out of a Material Recovery Facility system will result in heat loss due to boiling. A suitable water heating system, if required, can be obtained or be designed to give the requisite fast heat-up and complement the rest of an integrated reclamation line incorporating the differential density alteration unit and system.

The high temperature necessary to soften or foam materials for the differential density alteration process may necessitate that the water be pressurized to prevent boiling. A densifying screw auger, progressive cavity pump, or a star valve obtained or designed specifically for the purpose may be used to deliver material to the system.

The majority of any hot water used in the differential density alteration process loop that comes in contact with the process polymers may be extracted by using a dewatering classifier or low speed screening auger. The plastic may then be spray cooled and dried in a conventional spin dryer. Alternatively a pressurized spin dryer may be used to de-water the plastic in a single step if the high shear is not a problem for the plastics mix of interest.

In Material Recovery Facilities where continuous processes are not warranted, the feed stock plastic may be fed to, and the separated plastics products extracted to large batch solids filter tanks.

It is anticipated that a dry solids heating system may provide additional efficiencies when combined with other embodiments of the differential density alteration unit and process.

Another related unit operation that can be incorporated with the differential density alteration unit and system embodiments are Automated Control Systems for Hydrocyclones. For example automated, variable density slurry dense media systems, particularly multistage systems in which the separation density within each cyclone may be independently controlled.

The enhanced parameter distributions provided by the differential density alteration unit and method will enable relaxed demand on such a control unit. The improved distribution differentials provided by the differential density alteration units and method will reduce the number of stages of hydrocyclones needed for a given purity requirement. It will also reduce the amount of plastic material processed for a given yield requirement, i.e. reduced cost of the capital equipment required for a given product stream output rate.

Since the differential density alteration unit embodiments increase the differentials in density between separated product, the number of hydrocyclone stages required to sort materials to purity will be reduced. It will also enable separation of materials whose density differentials were previously too small for a reasonable number hydrocyclone stages to separate. The system permits separation of plastic mixture that vary in density by only 0.03 g/cc or less. This is particularly important to keep the number of stages to 3 or fewer to separate to 99% purity ABS and PP from automobile interiors which differ in density by sometimes as little as 0.03 g/cc.

Advanced Material Recovery Facility

Figure 4:
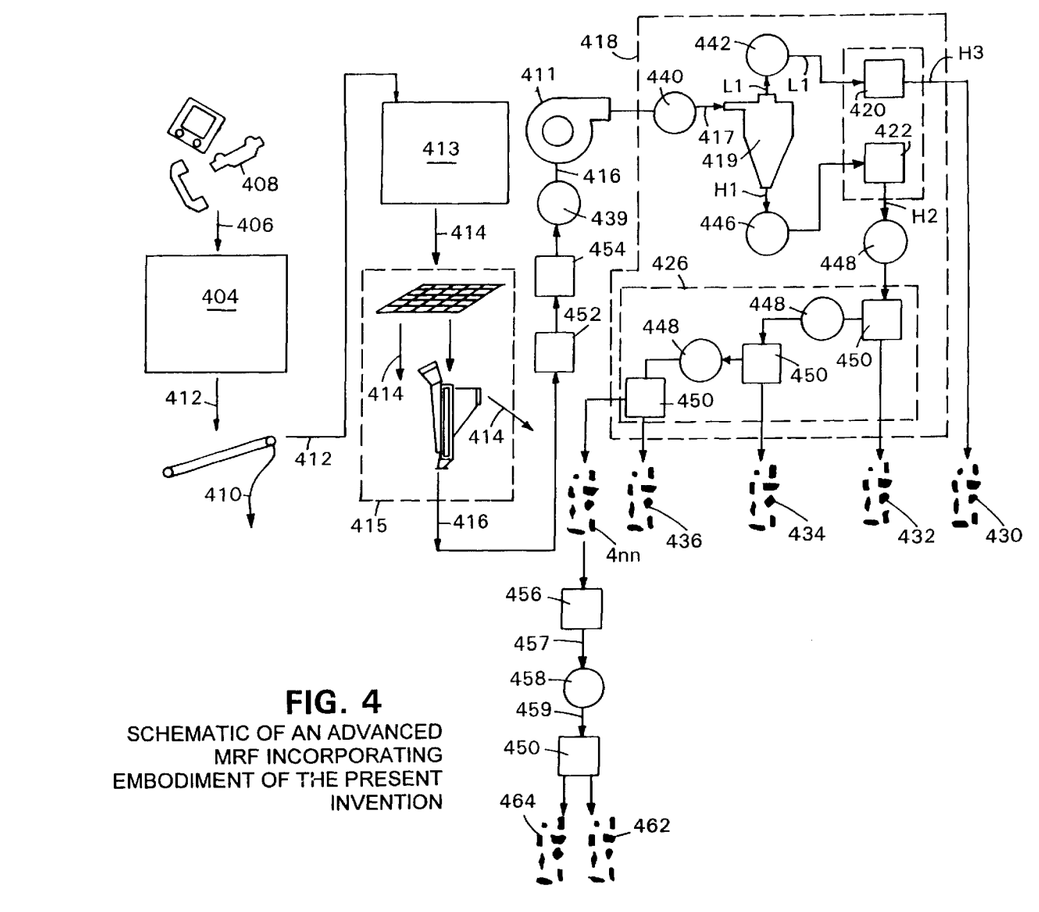
FIG. 4: Schematic of an advanced MRF incorporating embodiments of the present invention.

FIG. 4 depicts an Advanced MRF 400 incorporating embodiments of the present invention. An input feedstock handling unit [FHU] 400 receives a mixed plastic feed 406 as described previously with reference to the prior charts and tables, i.e. an aggregation of different unitary parts 408 from varied sources. The feed 406 may be broadly diverse including Shredded Electronic Scrap (ESR) material from different electronic equipment manufacturers or recyclers, Auto Shredder Residue (ASR) material from auto manufacturers, municipal collection and the like. The parts 408 are comprised, as before, or unitary objects of different materials sometimes bonded together (e.g., by gluing, riveting, melting, bolting and the like) and include a large proportion of a broad spectrum of different types and grades of plastics (polymers). The input feedstock 406 may include eleven or more major target polymers (resins) for recovery. These may include but are not limited to PC, PP, ABS, PVC, PA and PPO, HIPS, PS, POM, PC/ABS, PVC/ABS.

The input unit 404 typically will include a shredder to size reduce the parts 408 and liberate some or most of the included metals 410. Metals 410 are separated out from in-process material stream 412 by appropriate metal separators (not shown) available in the commercial market. The process stream 412 generally will pass to an additional size reduction stage, e.g. a granulator 413 that includes equipment for outputting an in-process material stream 414 having a narrowed size distribution. Unit 415 comprises a collection of operations to remove fine and oversize particles by means of, for example screening, thickness sorting slots, air classifiers and the like, to remove powder, dust, labels, fluff, and overly large chunks or strands of materials 414s.

In some preferred embodiments of MRF 400 incorporating the present invention, the screening and air classification 415 is preferentially set to reject dust and particles that will pass through a screen of about 12 mesh and accept only material that will pass through a screen of about 3/8 inch mesh, i.e., reject large pieces that would otherwise interfere with later unit operations. Finer powder and dust not removed at this stage can be removed by further cycling the product stream 414 through additional air classifiers, blowers (not shown).

The classified mixture of polymers 416 may be introduced into pretreatment stages 452 and 454 which may include thickness sorting, screening units, or units to alter the moisture or vapor content of components in the mixture of plastics, or a system to remove materials either less dense or more dense than a selected specific gravity or both less dense and more dense than a specific gravity range. The pretreatment units 452 and 454 may be followed by a differential density alteration unit 439. The differential density alteration unit 439 may be followed by a pump 411. The process stream 416 is then transferred to an input 417 of a separator unit 418 for separating target polymer(s) (described below) from the balance (described below) of the process stream 416.

Separator 418 can be one or more of the following standard types: density sorter, (classifier), which can be sink/float tank, centrifuge, hydrocyclone, water jig. Other density related sorters include a water table, air table, water and air elutriation systems. A density related sorter classifies based on density and another physical property such as shape, size or surface drag.

Preferably, the separator unit 418 is comprised of a single density sorter 419 and/or one or more groups of density classifiers (separators) indicated as separator units 420, 422, and 426. In the case of a separator 418 comprised of more than one separator as shown in FIG. 4, multiple outputs 430, 432, 434, 436, 4nn are available for selection as products for sale or as inputs to later separation or manufacturing processes.

Operation of preferred embodiments of MRFs 400 incorporating the present differential density alteration invention can be understood by examining differential density alteration units 440, 442, 446 operating with separators 419, 420, and 422. Differential density alteration unit 440 receives the product stream 416 from pump 411 and transfers a differentiated plastics product stream as input 417 to the separator 418.

In a multiple separator embodiment as shown in FIG. 4, the differentiated stream 417 is further separated by unit 419 into a heavy (H1) and light (L1) output. Output L1 is passed through differential density alteration unit 442 to another separator 420. Unit 446 further differentiates process stream H1 before differentiated process stream H1 is input to the following separator 422. Separator 420 receives differentiated output L1 from unit 442 and separates it respectively into heavy output H3 and a light output (not shown). Separator 422 outputs H2 and a lights stream (not shown).

In like manner additional differential density alteration units 448 are optionally included in respective separated product streams input to corresponding following separator units 450.

In general, at each respective separator process input stream, e.g., input 417, H1, L1, H2 a corresponding differential density alteration unit, e.g., 440, 442, 446, 448, is optionally placed to provide a respective differentiated input process stream to a corresponding separator unit in which the respective polymer mixture has been differentiated to enhance the respective polymer separation by the corresponding separator unit.

In some cases, depending on the mixture of polymers in the input feedstock 406, incorporating a suitably chosen differential density alteration 440 can enable separation of target polymers previously technologically difficult, economically disadvantageous, or even impossible to separate by prior technology.

Separators 418, 419, 420, 422, 424, 426 and 450 can optionally include mechanical de-watering devices, such as spin-driers, or screens.

Pretreatment processes prior to DDA

Optional pretreatment processes indicated by dashboard boxes 452, 454 may alternatively be included to prepare the plastic mixture stream 416 prior to a DDA unit 440. The processes 452, 454 may include foaming agent impregnation, density presorting (to remove plastics denser and/or lighter than a target range encompassing the plastic range of interest), thickness or size sorting (to make the density alteration provided by the DDA more uniform), and other processes useful for preparing plastics mixtures prior to a DDA step. DDA units 440, 442, 446, 448, and 458 may optionally include one or more pretreatment stages like those in 452 and 454.

Yet another alternative is to conduct the DDA process on a separated plastic process stream consisting essentially of a polymer of a single type but of different grades. For example with regard to FIG. 6 process output 4nn is input to an additional DDA pretreatment stages 456. Unit 456 prepares process 4nn for input into another DDA unit 458. Unit 458 is optimized to differentiate polymer grades in the stream 4nn before being input to separator unit 460. Separator 460 partitions the differentiated stream 4nn into output streams 462 and 464. Output streams 462 and 464 would be substantially more uniform or improved in some important aspect, e.g. a physical property as measured by some combination of qualifying tests or characteristics, i.e., melt flow rate, toughness, or DTUL or color.

Infra-Red-heater-conveyor belt embodiment of a DDA unit

Figure 5:
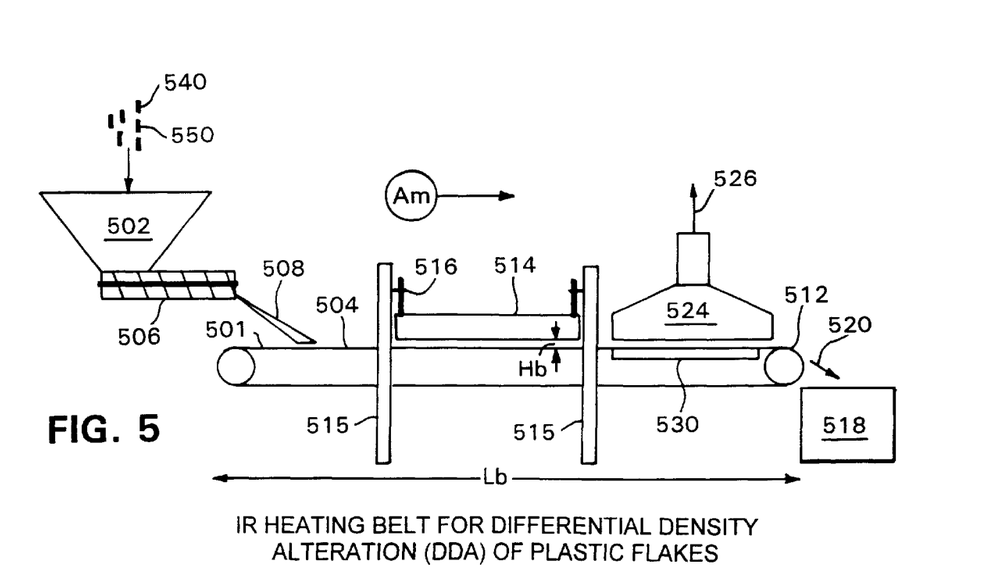
FIG. 5: I/R heating belt for differential density alteration (DDA) of plastic flakes.

With regard to FIG. 5, there is shown one preferred embodiment of a DDA unit 500. The unit 500 includes a feed mechanism 502 for feeding a polymeric process mixture at 457 that is the output of a pretreatment unit 456. 456 receives its process is optionally the output of a pretreatment unit (depicted in FIG. 4), which receives its process input and prepares it for input to the DDA 500.

The hopper 502 is arranged to conduct the feed to a corresponding input 506 of an Infra-Red-heater-conveyor belt unit 504 (I/R unit 500).

In the process stream fed to hopper 502 there are at least two different discrete polymeric materials 540 and 550, e.g., (divided plastic flakes, shredded and/or ground pieces or fragments), provided by the respective actions of the corresponding shredding, grinding, size classification equipments like those depicted in FIG. 4 that preceded their arrival at the input of the I/R unit 500. The I/R unit 500 alters or differentiates the difference between the apparent density of the one or more of the materials in the mixture of 540 and 560 by heating the mixture above the softening point of at least one of the components 540 and 560 and then cooling the mixture before the following separator 518 receives the treated material.

Operation of the I/R unit 500.

The mixture containing at least polymers 540 and 550 is received by hopper 502 of the I/R unit 500 heating system. The mixture is metered onto one side of heat resistant moving belt 504 at an input end 501 by a variable rate feeding device such as an auger 506. The material passes over a distributor 508 that uniformly spreads it over a width Wb perpendicular (not shown) to the motion of the belt 504 indicated by arrow Am. The heat resistant belt 504 constructed preferentially of polymer coated fiberglass has a variable speed roller drive assembly 512 to control the residence time, tr, of the plastic mixture 416 on the belt 504 under infrared heating panels 514. Panels 514 are mounted to supports 515 by adjustable mounting assembly 516. Panels 514 are rectangular facing the belt 504 and each cover an area of about 12 by 24 in. A number of panels is selected to provide an appropriate amount of heat to cause the target plastic materials in the stream containing 540 and 550 passing between the belt 504 and the panels 514 to heat appropriately. The panels 514 each have a face and are spaced adjacent to the one side of belt 504 by an adjustable mounting assembly 516 (e.g., threaded rods). Panels 514 can be adjusted via assembly 516 to vary spacing, Hb, of heated panel face (not shown) above the belt 502 from ½ to 12 inches. A vent hood 524 removes vapors 526 driven off by the heated plastic materials 540 and 550. A cooling unit 530 is mounted beneath and oppositely to the panel face with the moving belt 504 between. The cooling unit 530 is in contact with the belt 504 and cools the stream containing 540 and 550 through the belt to ensure that the plastic 540 and 550 will not agglomerate when removed from the belt 504 after the heating step. The cooled plastic mixture 520 is discharged to a separator 518 where separation occurs.

The I/R unit 500 is adjusted to heat the mixture containing 540 and 550 above the softening temperature where the target materials are foamed satisfactorily for separator to effectively separate them from the balance of the mixture. The residence time, tr, the panel temperature, the belt speed, and the spacing Hb are all adjustable to account for variations in the polymers contained in the process mix of 540 and 550.

Experimental Procedures

A number of different experiments were conducted to demonstrate the technology on a variety of commercially important mixtures of plastic.

Refrigerator liners are produced from both HIPS and ABS plastic. The two types of plastics are identical in appearance and have overlapping densities. A number of HIPS liners and a number of ABS liners were identified with an infrared spectroscopic technique. These liners were granulated separately and mixed together in approximately equal proportions. This mixture was heated in a laboratory convection oven for two minutes at 180° C. The mixture was then removed and allowed to cool. The cooled mixture was separated in water, which has a specific gravity of approximately 1.0 g/cc. Most of the ABS floated in water and most of the HIPS sank. The ABS was recovered from the surface with a purity of 87% and a total of 73% of the original ABS floated. The table summarizes this information.

| Comp. By Mass | Pre-treatment | Initial S.G. Distribution (g/cc) | Thermal Treatment of mixture | Final S.G. Dist. (g/cc) | Post-treatment of Mixture | Floating Fraction Purity |
|---|---|---|---|---|---|---|
| HIPS-48% | None | 1.02–1.06 | 2 min 180° C. Convection Oven | 0.96–1.06 | Sink/Float S.G. 1.0 g/cc | ABS-87% |
| ABS-52% | None | 1.0–1.11 | | <0.96–1.1 | | |

Several billion pounds of plastic are used each year in the manufacture of electronic equipment. When this equipment is shredded for metals recovery a mixture of very valuable plastics is produced. Flame retardant grades for ABS, and PC/ABS overlap in density and render the mixture inseparable using the prior art. Three plastic varieties, including: standard FR-ABS, FR-PC/ABS, and a different grade of PC/ABS were separately prepared The materials were ground to pass a ⅜ inch screen. The flakes were then thickness sorted to remove flakes thinner than 1.8 mm and thicker than 2.6 mm. The flakes were then screened into two separate fractions: a fine fraction between 5/32 in. and 7/32 in. in size, and a coarse fraction between 7/32 in. and 9/32 in. The flakes were blended to create a coarse, three component mixture of the FR-ABS, FR-PC/ABS, and the other PC/ABS grade, in equal parts. A fine mixture of the three constituents in equal parts was also created. Two significant tests were run one using no autoclave pretreatment on the fine flakes and a second trial at a lower temperature after exposing the coarse fraction to 30 psig steam for five minutes. The coarse fraction responded in a way very similar to the fine fraction due to the effect of saturating it with moisture in the autoclave. The coarse fracture would not have foamed to so great an extent after the thermal treatment step without autoclave pretreatment.

| Comp. By Mass | Pre-treatment of Mixture | Initial S.G. Dist. (g/cc) | Thermal Treatment of Mixture | Post-Treat. of Mixture | Product Purity |
|---|---|---|---|---|---|
| Fine Fraction w/o Autoclaving | | | | | |
| FR-ABS-33% | Thickness Sort | 1.17–1.20 g/cc | 2 min @ 160° C. | Sink/Float | <1.15 g/cc |
| PC/ABS-33% | 1.8 mm–2.6 mm | 1.17–1.20 g/cc | Convection Oven | S.G. 1.15 g/cc | FR-ABS 78% PC/ABS 22% |
| FR-PC/ABS-33% | Fine Screen Fraction 5/32–7/32 in. | 1.17–1.20 g/cc | | | |
| Coarse Fraction w/autoclaving | | | | | |
| FR-ABS-33% | 5 min. exposure to 30 psig. steam | 1.17–1.20 g/cc | 2 min @ 150° C. | Sink/Float | <1.15 g/cc |
| PC/ABS-33% | Thickness Sort | 1.17–1.20 g/cc | Convection Oven | S.G. 1.15 g/cc | FR-ABS 74% PC/ABS 25% FR-PC/ABS 1% |
| FR-PC/ABS-33% | 1.8 mm–2.6 mm Coarse Screen Fraction 7/32–9/32 in. | 1.17–1.20 g/cc | | | |

There are a number of available post-manufacturing scrap mixtures which are rejected at manufacturers and never sent to customers. One examples of this type of mixture is scrap produced by manufacturers of automobile tail-light housings. This mixture contains both PC and PMMA which must be separated to have high values. Three tests were run on mixtures of these two plastics from tail-lights with approximately the same material ratios. The advantage of screening and thickness sorting in conjunction with selection of the appropriate heating system is demonstrated by the experiment. In the first test the raw material is introduced to a convection oven which results in non-uniform heating. Next a screened and thickness sorted product is heated in a vibratory fluidized bed. Last a screened and thickness sorted material is heated using the Infrared (IR) Heating Belt. The vibratory fluid bed dryer causes the polymer to form molten clumps at the end of the deck. This unit does not have a controllable maximum residence time. A residence time distribution for the plastic results and occasionally material stays on the bed too long and flows. With time to pool of polymer grows until the bed must be cleaned.

The last automobile tail-light material test was one of the first trials with an IR heating belt and a very low watt density and long residence time were used. It was assumed that it would be necessary to heat the entire thickness of the flake at this early trial with the IR belt. Subsequent results show that surface heating on a IR belt conveyor is the preferred method. Surface heating enables much faster and higher energy exposure which results in foaming of polymer only at the surface. This limited foaming is satisfactory for separation and saves a great detail of energy in operation because only a small portion of the flake must be heated.

| Composition by Mass % | Pre-Distribution Treatment | Initial S.G. Thermal (g/cc) | Post-Treatment | Product Treatment | Purity |
|---|---|---|---|---|---|
| PC-85% | None | 1.18–1.21 | Convection Oven | Sink/Float @ S.G. 1.05 g/cc | <1.05 g/cc PC 98% @ 58% yield |
| PMMA-35% | | 1.18–1.21 | 2 min. @ 200° C. | | |
| PC-70% | Screen 7/32–9/32 in. | 1.18–1.21 | Vibratory Fluid Bed Dryer | Sink/Float @ S.G. 1.0 g/cc | <1.0 g/cc PC 100% @ 72% yield |
| PMMA-30% | Thickness sort 1.8–2.6 mm | 1.18–1.21 | 1 min. @ 180° C. | | |
| PC-70% | Screen 7/32–9/32 in. | 1.18–1.21 | Infrared Belt Heater | Sink/Float @ S.G. 1.05 g/cc | <1.0 g/cc PC 100% @ 88% yield |
| PMMA-30% | Thickness sort 1.8–2.6 mm | 1.18–1.21 | 23 sec. @ 0.89 kW/sq. ft. | | |

The technique can also be used to sort very complex mixtures. Automotive shredder residue (ASR) is the mixture of non-metallic materials left over after an automobile is shredded and the metals are removed. The mixture is available in very large quantities and could become a valuable feed material if separation challenges can be overcome. The ASR used in these experiments was first granulated to pass a ⅜ in. screen and air classified to remove dust. The mixture was then partitioned by density to yield discreet density fractions. These density fractions were then heated in order to remove the target polymeric components. In many cases it will be necessary to partition the feed by density in order to achieve an adequate final product purity.

The first two trials on ASR were conducted on small laboratory samples of material. The last trial shown in the table used a much larger sample of about 60 lbs. This last sample was density partitioned using a hydrocyclone system to remove both the heavy and the light fractions instead of a sing/float separation in a bucket. Operation of hydrocyclone separators at different separation densities is well suited in the prior art (SME Mineral Processing Handbook, Society of Mineral Engineers, Vol. 1, 1985, p 4-16 to 4-19.).

The foaming time in the last ASR experiment was only 6 seconds compared to 100 seconds with a convection oven. A Glenro Conveyorized gas infrared densifier oven for expanded polystyrene particles, Glenro, Inc. Paterson, N.J., which had been used originally to drive volatiles out of expanded polystyrene foam under atmospheric conditions, was used. The Belt was modified by removing the gas-fired heaters and substituting Research, Inc, Minneapolis Minn., Model 4554 high density pyropanels with model 664k SCR power controller. The two Pyropanels were fixed with adjustable mounting brackets. The advantage of the IR belt heater approach can be seen from the very short exposure time needed to cause foaming. The IR heater quickly delivers a very precisely controlled heat to the material and then allows the material to cool. The IR heating system which was used is depicted in the figure which follows the table.

Figure 6:
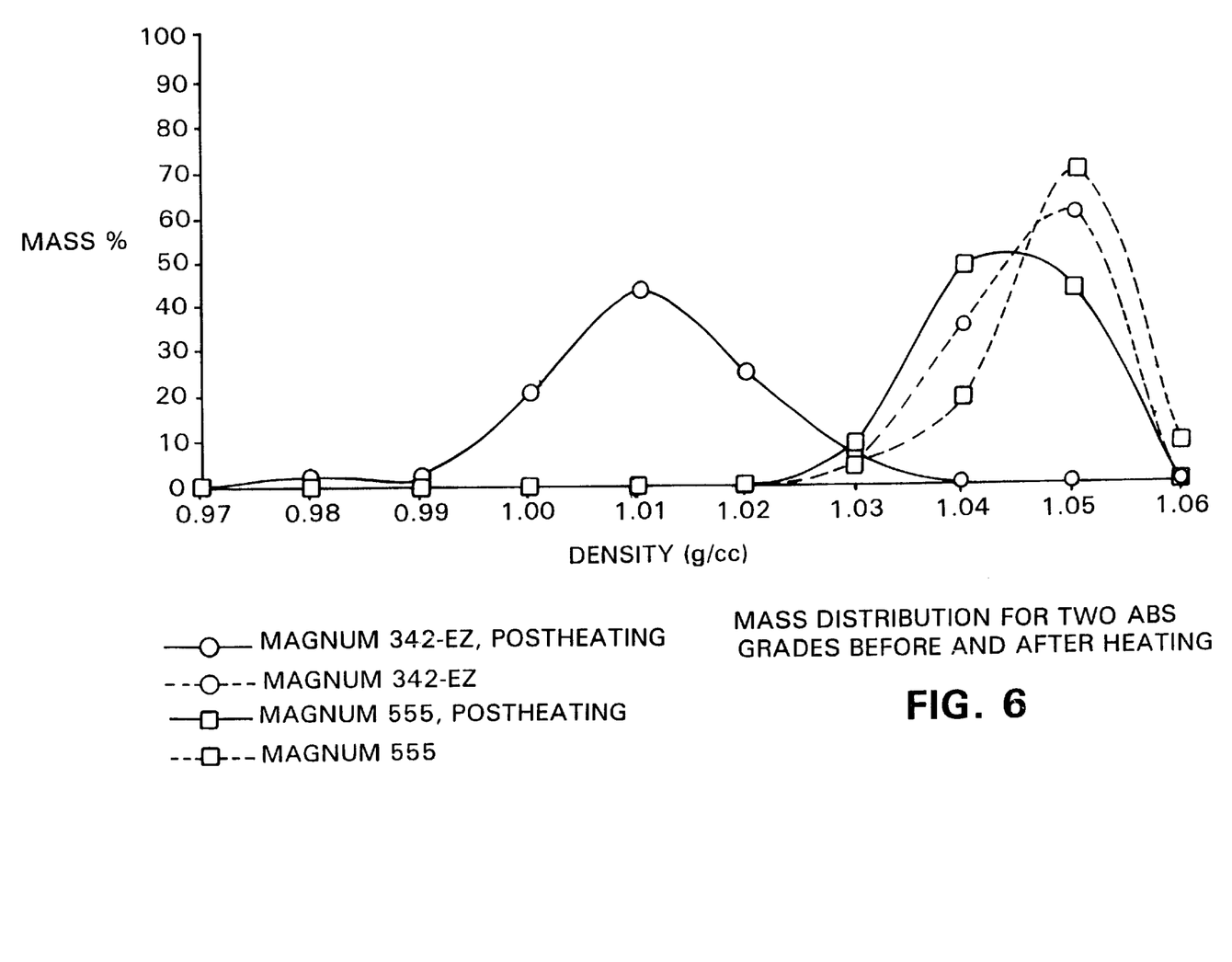
FIG. 6: Mass distribution for two ABS Grades before and after heating.

Magnum™ 342 EZ and Magnum™ 555 were obtained from the Dow Chemical Company. These grades differ in their melt flow rate (a measure of rheological properties), their Notched Izod Impact Strength (a measure of toughness), and their Deflection Temperature Under Load (a measure of their performance at elevated temperature). It is advantageous to be able to separate plastics such as these by grade to enable the manufacture of more nearly virgin quality plastics from recovered feed stocks. These grades and others are found in a mixed state in most potential recycling feed stocks. The capability of separating different grades of a given resin type also enables the manufacture of more uniform plastics from recovered feed stocks. The consistency and homogeneity of plastics can be more easily assured if grades of resin with different melt flow rates, toughness, and thermal properties are not sold in a mixed state. The different grades of ABS were molded into ⅛ in. thick plaques and cut into ½ in. squares. The flakes were fed to the IR heating belt and then separated in a 1.03 g/cc solution, to yield 90% pure products. The FIG. 6 illustrates the density distributions of the two ABS grades before and after heating.

The second experiment in the table that follows demonstrates the separation of two different grades of FR-PC/ABS from granulated, screened, partitioned by density, and thickness-sorted computer housings. The melt flow rate of the plastic in each computer housing was determined first then the plastics were mixed together and passed over the IR heating belt. The flakes were then separated in a 1.02 g/cc solution. The melt flow rates of the products were very close to the melt flow rates of the constituents of the mixture. Other properties such as toughness and deflection temperature under load are known to correlate to melt flow rate.

The third experiment, which attempted to separate yet another mixture of FR-PC/ABS materials, resulted in com-

| Composition by Mass % | Pre-treatment | Initial S.G. Distribution (g/cc) | Thermal Treatment | Post-Treatment | Product Purity |
|---|---|---|---|---|---|
| Rubber-46% PC/ABS-24% PP-9% Other-21% | Granulation, Air classification, and Density partitioning w/ sink/float | 1.08–1.15 g/cc | 100 sec. @ 180° C. Convection Oven | Sink/Float S.G. 1.0 g/cc | <1.0 g/cc PC/ABS 84% Yield 40% |
| Rubber-47% PC/ABS-12% PC-13% Other-28% | Granulation, Air classification, and Density partitioning w/ sink/float | 1.17–1.20 g/cc | 100 sec. @ 180° C. Convection Oven | Sink/Float S.G. 1.0 g/cc | <1.0 g/cc PC 95% Yield 90% |
| ABS-48% PUR-15% Rubber-9% Other-28% | Granulation, Air classification, and Density partitioning w/ hydrocyclone | 1.05–1.09 g/cc | 6 sec. @ 12 kW/sq. ft. IR Belt Heater | Hydrocyclone S.G. 1.0 g/cc | <1.0 g/cc ABS 85% Yield 69% |

The last series of experiments demonstrates the high degree of selectivity of the technology. The process is capable of separating different grades of a single resin type. Two different commercially available grades of ABS can be separated from a mixture as shown in the first experiment.

ponents of the mixture discoloring due to excess heat. Experiments, such as this one, are necessary to establish an upper-bound for exposure time, feed rate, power, spacing and the resulting surface or bulk maximum temperature (Tmax) for the materials on the IR belt heater.

| Resin Grades by Mass % | Melt flow Rate (g/10 min) | Pre-treat. | Init. S.G. Distribution (g/cc) | Thermal Treat w/ IR Belt | Final S.G. Distribution (g/cc) | Post-treatment | Product Purity |
|---|---|---|---|---|---|---|---|
| ABS 342 EZ-50% | 7.7 | Mold ⅛ in. sheet and cut into ½ in. squares | 1.03–1.06 | 7 sec. @ 15.7 kW/sq. ft. | 0.99–1.04 | Sink/Float @ S.G. 1.03 g/cc. | <1.03 g/cc ABS 342EZ-90% |
| ABS 555-50% | 2.2 | | 1.03–1.06 | | 1.02–1.06 | | >1.03 g/cc ABS 555-90% |
| FR-PC/ABS I-58% | 10 | Granulate Screen ⁷⁄₃₂–⁹⁄₃₂ in. Thickness sort 1.8–2.6 mm | 1.15–1.20 | 6 sec. @ 18.9 kW/sq. ft. | 0.95–1.12 | Sink/Float @ S.G. 1.02 g/cc. | <1.02 g/cc FR PC/ABS I-83% MFR = 11 g/10 min. |
| FR-PC/ABS II-44% | 17.7 | | 1.15–1.20 | | 1.0–1.15 | | >1.02 g/cc FR PC/ABS II-78% MFR = 17.5 g/10 min. |
| FR-PC/ABS I-82% | 10 | Granulate Screen 7/32–9/32 in. Thickness sort 1.8–2.6 mm | 1.13–1.20 | 10 sec. @ 14.4 kW/sq. ft. | 0.95–1.20 | | Material discolored |
| FR-PC/ABS II-18% | 15 | | 1.13–1.20 | | 0.99–1.15 | | |

References

U.S. Pat. No. 5,301,810
U.S. Pat. No. 3,599,788
U.S. Pat. No. 5,590,789
U.S. Pat. No. 5,303,826
U.S. Pat. No. 5,061,735
U.S. Pat. No. 5,061,735

References

1. Beck, 1993 *National Post-Consumer Plastics Recycling Rate Study*
2. *Garbage, Trash, Refuse, Waste, Discards, Rubbish, & Junk, The Book* 2, Nicholas and Dezenhall Communications Management Group, 1992, p. 40.
3. Biddle, Michael B. and Mann, Ray, "Recipe for Recycling" *IEEE Spectrum*, August, 1994, pp. 22–24.
4. *Cost Evaluation of Automated and Manual Post-Consumer Plastic Bottle Sorting Systems*, U.S. Environment Protection Agency, September, 1994.
5. *Plastics Reclamation and Recycling*, SRI International, January, 1992, p. 5–29, 6–16.
6. Biddle, Michael B. and Fisher, Michael M. "A Mechanical Recycling Process for Recovery of Plastics from End-ofLife Computer and Business Equipment", *Conference Proceedings of 22nd Annual Technical Conference*, Structural Plastics Division of SPI, Apr. 10–13, 1994.
7. Biddle, Michael B. "An Overview of the Recycling of Plastics from Durable Goods", *Conference Proceedings of International Plastic Recycling Conference*, Society of Plastics Engineers, Chicago, Ill., Nov. 3–4, 1994.
8. Biddle, Michael B. "Advances in Mechanical Separation and Recycling of Mixed Automotive Plastics", *Conference Proceedings of auto Recycle* 94, Dearborn, Mich., Nov. 8–9, 1994.
9. "Plastics in . . . the USA", Society of Plastics Industry, Washington, D.C.
10. "Recycling Making Headway", *Plastics Engineering*, December, 1994, p. 21.
11. *Waste Age's Recycling Times*, Jan. 24, 1995.
12. *Modern Plastics*, March, 1994, pp. 61–62.
13. *Plastics News*, Feb. 6, 1995.
14. *Facts & Figures of the U.S. Plastics Industry*, The Society of Plastics Industry, Inc., 1993, p. 23.
15. *Plastics and the Environment*, The Society of Plastics Industry, Inc., 1991, p. 47.

The entire contents of all of the above references are here-in incorporated by reference.

What is claimed is:

1. A method of separating polymers from a mixture of different polymers, the method comprising:
   heating the mixture of different polymers to foam at least one polymer in the mixture of different polymers; and
   separating said mixture based on a change in density caused by said heating.

2. The method of claim 1, further comprising decreasing pressure over the mixture of different polymers.

3. The method of claim 1, wherein the mixture of different polymers is heated to a softening point of at least one polymer in the mixture of different polymers.

4. The method of claim 1, wherein the mixture of different polymers comprises polymers having a difference in density less than about 0.03 g/cc.

5. The method of claim 1, wherein heating the mixture of different polymers comprises heating only surfaces of the polymers.

6. The method of claim 1, wherein heating the mixture is performed at a rate sufficient to change the apparent density of at least one polymer in the mixture of different polymers.

7. The method of claim 1, wherein heating the mixture of different polymers is performed in a water slurry.

8. The method of claim 1, further comprising pre-sorting the mixture of different polymers according to density.

9. The method of claim 1, further comprising pre-sorting the mixture of different polymers according to size.

10. The method of claim 9, further comprising pre-sorting the mixture of different polymers according to thickness.

11. The method of claim 1, further comprising contacting the mixture of different polymers with a foaming material.

12. The method of claim 11, wherein the foaming material is selected from a group consisting of water, steam, carbon dioxide, and hydrocarbon.

13. The method of claim 1, wherein heating the mixture and separating the mixture are performed in continuous process.

14. The method of claim 1, further comprising conveying the mixture of different polymers on a conveyor belt.

15. The method of claim 1, wherein heating the mixture is performed under atmospheric conditions.

16. A method of separating polymers from a mixture of different polymers, the method comprising:

contacting the mixture of different polymers with carbonated water at a first temperature and under pressure;

decreasing the pressure over the carbonated water; and separating the mixture of different polymers based on a change in density caused by said decreasing of pressure.

17. The method of claim 16, further comprising contacting the mixture of different polymers with carbonated water at a second temperature and under pressure, wherein the second temperature is different than the first temperature.

18. A method of separating polymers from a mixture of different polymers, the method comprising:

heating the mixture of polymers to a softening temperature of at least one polymer in the mixture, wherein heating is performed under a pressure greater than atmospheric pressure to increase the density of said at least one polymer; and separating said mixture based on a change in density caused by said heating.

19. The method of claim 18, further comprising introducing voids into the different polymers.

* * * * *